Dec. 30, 1947.                O. V. MALMQUIST                2,433,469
                        INERTIA-OPERATED STOP SIGNAL
                            Filed June 28, 1943
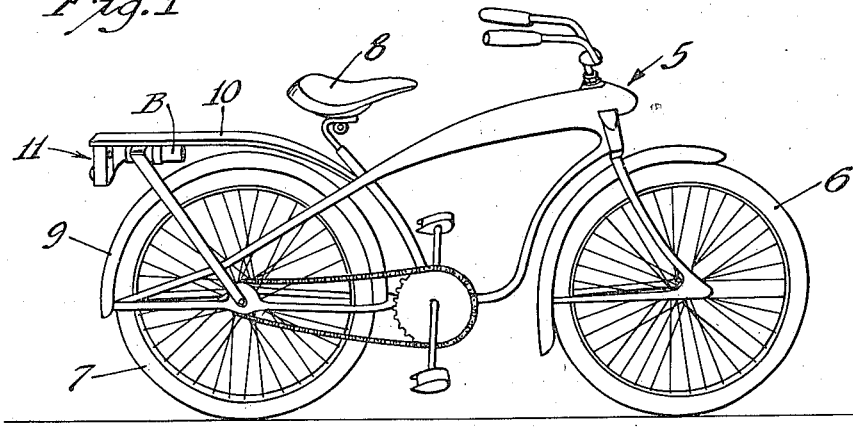
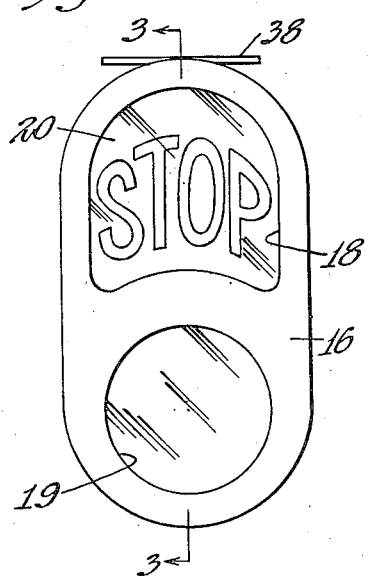
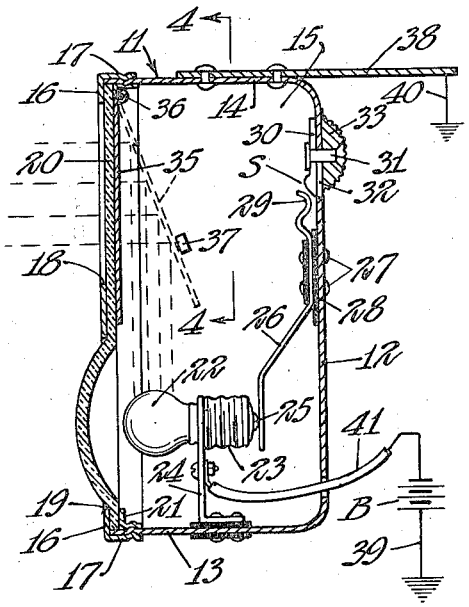
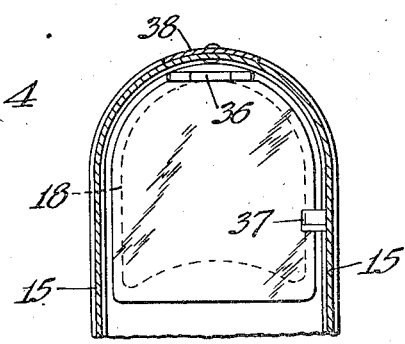
Inventor
Oscar V. Malmquist
By
Attorneys Patented Dec. 30, 1947

2,433,469

UNITED STATES PATENT OFFICE 2,433,469

INERTIA-OPERATED STOP SIGNAL

Oscar V. Malmquist, Minneapolis, Minn.

Application June 28, 1943, Serial No. 492,514

8 Claims. (Cl. 177—329)

My present invention relates to vehicle stop signals and more particularly to what may be termed inertia-operated vehicle stop signals. Preferably and as herein illustrated, the invention comprises a combination vehicle stop signal and tail-light wherein operation of the stop signal portion thereof is automatically brought about by inertia resulting from retardation of forward motion and more particularly by a combination of inertia and gravity. While the invention is applicable to any kind of vehicle, it is primarily intended as a stop signal or combined stop signal and tail-light for bicycles, velocipedes, and the like, wherein low cost, compactness, and dependability of operation are of prime importance.

The above and other highly important objects and advantages of the invention will be made apparent from the following specification, claims, and appended drawings.

Referring to the drawings:

Fig. 1 is a side view of a bicycle equipped with the invention;

Fig. 2 is a rear face view of a combined stop signal and tail-light of Fig. 1, showing the same on a greatly enlarged scale;

Fig. 3 is a transverse sectional view taken on the line 3—3 of Fig. 2; and

Fig. 4 is a fragmentary sectional view taken on the line 4—4 of Fig. 3 and looking from right toward the left in respect to Fig. 3.

In Fig. 1, a conventional bicycle is indicated as an entirety by 5, the front wheel of the bicycle by 6, the rear wheel of the bicycle by 7, the seat of the bicycle by 8, the rear mud guard or fender of the bicycle by 9, and a parcel carrier which overlies the rear wheel is indicated by 10.

The combined stop signal and tail-light forming the preferred embodiment of the invention illustrated comprises a rectangular signal casing, indicated as an entirety by 11, having a front wall 12, a bottom wall 13, a top wall 14, side walls 15, and a rear wall 16. The front, bottom, top, and sides of the signal casing are shown as integrally formed from stamped sheet metal and completely closed to passage of light; whereas, the rear wall 16 of the casing is shown as being of the removable type having a rectangular flange 17 that telescopes over and frictionally engages the rear portion of the main casing body. This removable rear casing wall 16 is provided with a signal aperture 18 and a tail-light aperture 19, the latter underlying the former. The light apertures 18 and 19 are covered by suitable translucent material such as a panel of red glass 20 that is normally held in place by the removable rear wall or cover plate 16 and flange or flanges 21 of the main casing body. Preferably, but not essentially, the translucent panel 20 is formed at the stop light aperture 19 with an outwardly bulged or convex portion.

Mounted within the signal casing 11 and preferably coaxially with the tail light aperture 19 is a conventional electric lamp in the nature of a tail light bulb 22. This light bulb may be a conventional flash-light bulb and the base is mounted in a suitable socket 23 which, in turn, is mounted on the bottom of the casing through the medium of a bracket 24. In accordance with conventional practice, the shell or base of bulb 22 constitutes one of its electrical contacts. The other or center contact of the bulb 22 is indicated by 25, and this contact engages a spring contact 26 that is anchored to the rear wall of the casing by rivets or the like, but is electrically insulated therefrom by a suitable insulating strip 28, and has a projecting end 29 forming one of the contacts of a switch S. The other or movable contact of the switch S is indicated by 30 and is vertically slidably mounted on the front wall 12 of the casing by means of a rivet or the like 31 working through a vertical slot 32. Rivet 31 works through and anchors to the sliding contact 30 a switch-operating button 33.

The signal light aperture 18 is normally closed to passage of light by a shutter 35 that is horizontally pivoted at 36 to the upper interior portion of the signal casing immediately adjacent the top of the signal aperture 18. This shutter 35 is of such size as to completely cover the signal aperture 18 but does not overlap or close off any portion of the tail-light aperture 19, and is yieldingly biased by gravity to move to its vertical signal aperture closing position shown by full lines in Figs. 3 and 4. This shutter 35 is, however, free to move pivotally forwardly to a shutter open position shown by dotted lines in Fig. 3, and in which position of the shutter light emitted from the bulb 22 will illuminate the signal aperture 18 in addition to the tail-light aperture 19. Preferably, forward opening pivotal movements of the shutter are limited by a stop or stops 37 projecting from a side wall or walls 15.

The signal lamp casing may be mounted at the rear of a vehicle such as a bicycle in any suitable manner, but as herein illustrated is mounted at the rear of the bicycle 5 by a mounting bracket 38. In fact, as shown, the signal housing is mounted under the rear projecting portion of the parcel carrier 10 and may be assumed to be anchored thereto through means such as the bracket 38 with its light apertures 18 and 19 facing rearwardly. The light bulb 22 of the signal is adapted to be energized from a suitable source of potential such as a flash-light battery B, shown as being mounted under the parcel carrier 10 in Fig. 1. One side of the battery B is grounded to the bicycle frame or parcel carrier 10 by a lead 39 and the signal casing may also be assumed to be grounded to the parcel carrier as indicated at 40 in Fig. 3. The other side of the battery B is connected to the shell contact of bulb 22 through a lead 41, bracket 24, and socket 23. To now complete the circuit, it is only necessary to actuate the sliding contact 30 of switch S in a downward direction to bring the same into engagement with its cooperating contact 20, which will complete the circuit by connecting the contact 25 of bulb 22 to the grounded side of the battery. Preferably, the area of the translucent panel 20 covering signal aperture 18 has portions of reduced density or greater transparency, forming the letters "Stop." In other words, these portions forming the letters "Stop" in the translucent glass panel preferably have greater light-emitting qualities than the other portions of the translucent panel 20 and, hence, illuminate more brightly.

Operation

With the arrangement illustrated, the shutter will remain closed during conditions of arrested motion, accelerated forward motion, or relatively constant forward motion, but will swing forwardly to its open position and permit illumination of the stop signal aperture 18 by its own inertia under rapid retardation of forward motion, such as caused by application of the bicycle brake. Hence, an effective stop signal will be produced automatically, and without any attention whatever from the operator, every time he applies the brake to stop the bicycle or otherwise rapidly retards the forward motion.

What I claim is:

1. An inertia-operated vehicle stop signal comprising a lamp housing having light and signal apertures in its rear wall and containing a source of illumination, an inertia-operated shutter suspended in the casing for movements to and from a signal aperture closing position in directions rearwardly and forwardly of the signal casing, said shutter being yieldingly biased by gravity toward the signal aperture closing position but being free to move to a signal aperture uncovering position by its own inertia when forward movement of the signal housing is abruptly retarded.

2. The structure defined in claim 1 in which the shutter is pivoted to the signal casing immediately adjacent one edge of the signal aperture and is so weighted that it will move pivotally to an open position by inertia resulting from sudden retardation of forward motion.

3. The structure defined in claim 1 in which the said shutter is horizontally pivoted to the interior of the casing immediately adjacent the top of the signal aperture and is subject to the yielding action of gravity to move to a depending signal aperture closed position and under retardation of forward movement is subject to its own inertia to pivot forwardly to a signal aperture open position.

4. A combined vehicle tail-light and stop signal comprising a lamp housing having in its rear wall a tail-light aperture and a stop signal aperture, a signal lamp positioned in the casing to illuminate the space therein back of both of said apertures, and an inertia-opened gravity-closed shutter pivoted within the casing above the stop signal aperture, said shutter being suspended from its pivot so as to be yieldingly biased by gravity toward a signal aperture closed rearward position and to be responsive to its own inertia to move away from the signal aperture under retardation of forward movement.

5. The structure defined in claim 4 in which the said apertures are located one above the other, and in which the said shutter is of such size as to close only the signal aperture.

6. A combined vehicle tail-light and stop signal comprising a lamp housing having in its rear wall a signal aperture and a tail-light aperture below the signal aperture, a tail lamp positioned within the lamp housing back of the tail-light aperture, and an inertia-opened gravity-closed shutter located within the housing back of the signal aperture and adapted to cover the same without obstructing the tail-light aperture, said shutter being horizontally pivoted at its upper edge to the housing adjacent the top of the signal aperture so that the shutter will be gravity biased toward a signal aperture closing position and is responsive to its own inertia to swing inwardly to a signal aperture open position under retardation of forward movement, whereby when the signal aperture is open light from the tail lamp will illuminate both the tail-light and signal light apertures.

7. An inexpensive light and signal casing for bicycles and the like comprising a casing having light and signal apertures, a shutter pivoted in the casing so as normally to swing in a covering position over the signal aperture, said casing being sufficiently large so that the shutter may swing therein to a position to uncover the signal aperture, an electric light in the casing sufficient to illuminate both apertures and a switch therefor mounted on the casing for operation from the exterior thereof.

8. As an article of manufacture, an inexpensive tail light and stop light assembly for bicycles and the like comprising a casing having a removable cover plate, an electric lamp in the casing and a switch for controlling the lamp mounted on the casing, said cover plate having a tail light aperture and a stop light aperture, said lamp being sufficient to illuminate both apertures and a cover plate pivotally mounted for swinging movement within the casing from a first position covering the signal aperture to a second position uncovering said aperture, said swing plate being normally biased to the first position.

OSCAR V. MALMQUIST.

REFERENCES CITED

The following references are of record in the file of this patent:

UNITED STATES PATENTS

| Number | Name | Date |
| --- | --- | --- |
| 1,147,829 | Triest | July 27, 1915 |
| 1,480,783 | Sawyer | Jan. 15, 1924 |

FOREIGN PATENTS

| Number | Country | Date |
| --- | --- | --- |
| 674,950 | France | Oct. 28, 1929 |
| 707,120 | France | Apr. 13, 1931 |